United States Patent [19]

Gasser et al.

[11] 3,992,983
[45] Nov. 23, 1976

[54] PREPARATION OF TEA EXTRACTS

[75] Inventors: Rupert Josef Gasser; Steven N. Watercutter, both of Marysville, Ohio

[73] Assignee: Societe d'Assistance Technique pour Produits Nestle S.A., Lausanne, Switzerland

[22] Filed: Dec. 5, 1973

[21] Appl. No.: 421,852

[52] U.S. Cl. .................................. 99/287; 426/435
[51] Int. Cl.² ............................................ A47J 31/00
[58] Field of Search ............ 99/275, 279, 286, 287, 99/298; 23/267 D, 270 R, 273 F; 426/435, 385, 387

[56] References Cited
UNITED STATES PATENTS

| | | | |
|---|---|---|---|
| 1,079,474 | 11/1913 | Davis | 99/298 |
| 2,831,038 | 4/1958 | Morrison | 23/270 R |
| 2,874,629 | 2/1959 | Kahan | 99/298 |
| 3,142,589 | 7/1964 | Schaffer | 23/270 R |
| 3,148,069 | 9/1964 | Sjogren | 23/270 R |

*Primary Examiner*—Robert W. Jenkins
*Attorney, Agent, or Firm*—Watson Leavenworth Kelton & Taggart

[57] ABSTRACT

A process for preparing a tea extract is disclosed in which a heated aqueous tea slurry is confined in a first zone separated from a second zone by a liquid-pervious barrier, a body of extraction liquid is maintained in said second zone to permit diffusion of tea solubles from the tea slurry into the extraction liquid, the volume of the slurry being 0.5 to 2.5 times the volume of the body of extraction liquid. After a suitable contact time, the extraction liquid and slurry are removed from the zones and the tea solubles diffused in the extraction liquid and present in the slurry ultimately are combined, intervening processing including, for example, stripping and removing of aromatic volatiles before a final extract product is provided. Apparatus for carrying out the process also is disclosed.

10 Claims, 3 Drawing Figures

PREPARATION OF TEA EXTRACTS

This invention is concerned with the preparation of tea extracts.

Tea extracts can be prepared in various known manners, e.g., extraction with water of tea which is disposed in one or more static beds. Extraction methods have also been described in which the tea is moved countercurrent to the extraction liquid, as well as parallel-flow processes where the tea, in finely-divided form, is slurried with water and the slurry heated to the appropriate temperature of extraction. The variety of the approaches proposed would indicate that an industrial-scale procedure leading to an extract having optimal flavor qualities is still being sought.

An object of the present invention is to provide a process for preparing tea extracts having the flavor, aroma and appearance characteristics of freshly brewed tea.

Another object of the invention is to provide an apparatus for carrying out the process.

In accordance with the invention, a process for preparing a tea extract comprises maintaining an aqueous tea slurry at a temperature of at least about 90° C in a confined first zone having a liquid-permeable wall whilst simultaneously maintaining a body of aqueous extraction liquid at substantially corresponding temperature in a second zone separated from the first zone and in contact with at least a substantial part of the permeable wall to permit diffusion of tea solubles from the aqueous tea slurry into the aqueous extraction liquid, the volume of the slurry being 0.5 to 2.5 times the volume of the body of extraction liquid, and after a contact time of at least 2 minutes combining at least a part of the tea solubles diffused into the extraction liquid with tea solubles present in the slurry.

The slurry is prepared by mixing tea with water in the desired proportions. Depending on the physical characteristics of the tea used, such as particle size, the minimum weight of water necessary to provide a slurry will generally be between 6 and 10 times the weight of the tea, since about 3 to 4 parts by weight of water are required for wetting one part by weight of dry tea and about 3 to 6 parts of water are needed for forming a slurry that is pumpable. Good process and extract results can be achieved, for example, with a slurry having a water to dry tea ratio in a range of about 6 parts to 20 parts or more by weight of water for each part of dry tea. The upper limit on the proportion of water to dry tea is essentially dictated by practical considerations, since in the preparation of extracts in dry form the water added has to be removed subsequently. Most conveniently the slurry is prepared by mixing the tea directly with water at the desired extraction temperature. This is at least about 90° C and, unless the extraction is effected under pressure, will not exceed 100° C. Although the slurry is preferably prepared with water, it is also possible to use a tea extract, for example an extract obtained by extracting partially extracted tea. Likewise, the aqueous extraction liquid contacted with the permeable wall may be water or it may be an aqueous medium which at least in part is a tea extract.

The process may be carried out batchwise or continuously, the latter method being preferred as being more appropriate for industrial operations.

In a continuous operation, for example using the apparatus described hereinafter, the tea slurry may be formed by feeding metered quantities of tea and water to the first zone whilst simultaneously supplying aqueous extraction liquid to the second zone separated from the first zone at a controlled rate. Alternatively, a tea slurry may be prepared and heated to the desired temperature just prior to its introduction into the first zone.

Extraction within the first zone, and particularly the diffusion of solubles therefrom into the aqueous liquid in the second zone in contact with the permeable wall of the first zone, extends over at least 2 minutes, and preferably for about 3 to 5 minutes. An upper limit on the length of this contact time is determined by practical considerations, and it has also been observed that extended times are unnecessary and may even be detrimental to the quality of the finished product. Following the extraction, the slurry and diffused tea solubles containing liquid may be combined directly, or they may be recovered separately for subsequent processing. For example, after being withdrawn from the first zone, the slurry may be subjected to a stripping operation for recovery of volatile aromatics, following which the tea insolubles may be removed, as by decanting, centrifugation or filtration. The resulting extract may then be combined with the diffused solubles, optionally after concentration, whereas the insolubles may be subjected to a second extraction, either by conventional techniques or by the process according to the invention. Alternatively, the insolubles may first be removed from the slurry and the extract stripped and/or concentrated. The liquid containing diffused solubles may be concentrated (e.g. by freeze-concentration) and/or stripped, the latter if desired being followed by fractionation. The solubles may then be combined with the extract recovered from the slurry by any of the techniques described above, and the mix dried to provide a powdered extract. Aromatics previously stripped during the process are added normally prior to drying, usually to a concentrated extract. Spray, vacuum, drum- and freeze-drying of the concentrated extract may be used. Optionally and if a liquid extract product is desired, the insolubles can be removed from the slurry and the slurry liquid combined directly into the extraction liquid to provide a liquid tea solubles extract.

The process is advantageously carried out in an extraction apparatus which constitutes a feature of the present invention. The apparatus comprises a first elongate chamber having a liquid-pervious wall, means defining a second chamber substantially coaxial with the first chamber, means for feeding a slurry into one of the chambers and means for withdrawing slurry from that chamber, means for feeding an extraction liquid into the other chamber and means for withdrawing extraction liquid from this chamber.

A preferred arrangement of the apparatus according to the invention is shown by way of example in the accompanying drawings, in which.

Figure 1:
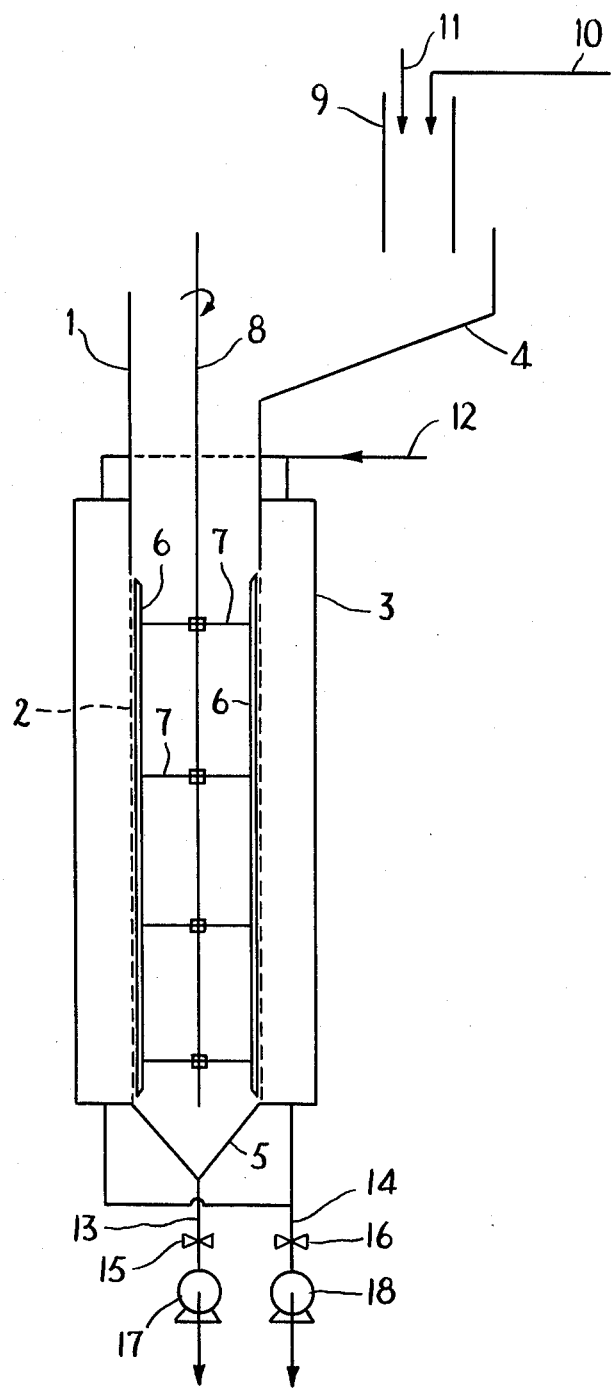
FIG. 1 is a schematic side view of the extraction device.

The apparatus comprises a vertical column 1 having a perforated wall at 2, and surrounded by a jacket 3, the column 1 and jacket 3 having any shape suited to the intended purpose, e.g., being cylindrical and desirably coextensive in length. Where these members are cylindrical the ratio of the diameter of jacket 3 to column 1 can be about 1.5 to 1. The available volumes of the column and jacket may be approximately equal, although this is by no means necessary. The construction, however, should be such that it is possible to maintain the ratio between the volume of slurry and volume of extraction liquid such as water within the limits noted previously, that is from 0.5:1 to 2.5:1. A hopper 4 is provided at the upper part of the column, and its lower end terminates in a cone 5. The spring-loaded scraper blades 6 are mounted on arms 7 attached to the shaft 8. The shaft is rotated by an appropriate motor (not shown). A mixing conduit 9 is provided in the hopper 4, and a line 10 for supplying aqueous medium leads into the conduit 9, where the liquid is mixed with dry tea entering at 11. Extraction liquid is supplied to the jacket 3 through the line 12, whereas slurry and extraction liquid are withdrawn from the appparatus via lines 13 and 14, these lines being provided with valves 15 and 16 and connected to withdrawal pumps 17 and 18 respectively.

In operation, dry tea and water heated to about 95° C are mixed in appropriate proportions in the conduit 9 to form a slurry which flows into the first or central zone defined by column 1. At the same time, water at substantially corresponding temperature is supplied to the outer encircling annular second zone defined by jacket 3. For continuous operation, which is preferred, the column 1 and jacket 3 are first filled with water, and then the tea is fed into the hopper 4.

The shaft 9 is rotated very slowly, for example at 1 to 5 rpm, (although higher rpm can be used if necessary provided undue agitation of the slurry is avoided) as the principal function of the blades 6 at the tip ends of arms 7 is to engageably contact and sweep the inside walls of the column to prevent plugging of the openings or perforations 2 and it is as indicated above preferable to avoid excessive agitation of the slurry. Openings 2 are provided in column 1 to the extent required to permit achievement of the desired diffusion of extracted solubles from column 1 to jacket 3. The openings generally will be of a size sufficient to permit tea solubles solids to pass therethrough but insufficient to allow tea insolubles to pass through the openings into jacket 3. The openings may, for example, represent about 5% of the wall area of column 1 and be 1.6mm diameter circular openings. Further, the openings are designed in an arrangement from the lower end of the column upwardly for about 80% to 85% of the column height which is coextensive with the jacket 3. The upper 15% to 20% of the column height being liquid impervious allows for proper wetting and expansion of the tea and deters premature diffusion to the second zone. The feed rates of tea and of water or extraction liquid supplied to the column and jacket are chosen to maintain an overall ratio of liquid to tea which is preferably in the range (by weight) of 10:1 to 100:1. Moreover, the total liquid may be split between the column and jacket in various proportions, provided that the volume ratio of slurry to extraction liquid is within the range 0.5:1 to 2.5:1. Moreover, it is desirable in continuous processing to control the slurry velocity and extraction liquid velocity so that the former is slower than the latter, e.g., about 2 to 2.5 times slower, and therewith enhance the diffusion of extracted solubles from the slurry to the extraction liquid. Particularly satisfactory conditions of extraction are achieved when the liquid supplied to the inner column represents between 60% and 75% of the total weight of liquid. Moreover, by providing a suitable metering pump 18 on the outlet line 14, the amount of liquid withdrawn from the jacket may be greater than the amount supplied to the jacket through line 12. Under these conditions, there is enhancement of transfer of tea solubles from the slurry into the extraction liquid present in the jacket. Further particulars of these operational variants are given in the examples.

In continuous operation, the residence or hold-up time of the slurry within the apparatus will, in the preferred vertical arrangement described with reference to the drawings be that required to produce solubles removable effective to provide the desired optimum extract characteristics, particularly flavor. This hold-up rate is for any given column height usually within the range of about 2 to about 5 minutes.

Various modifications are possible in the construction of the apparatus. For example, a plurality of concentric perforated columns may be provided, coaxially housed within a single casing, so that one or more annular bodies of a slurry may be contacted with extraction liquid on the inside and the outside of the respective annuli. Other desired apparatus configurations also could be employed. For example, the apparatus could comprise an elongate rectangular or elliptical sectioned shell divided along its longitudinal axis by a perforated plate into two chambers, one of which is supplied with tea slurry and the other with extraction liquid. Provision may also be made for combining the extraction liquid with the slurry within the apparatus itself, for example by permitting the liquid to flow into the column through one or more suitably large openings located beneath the perforated part. Thus, the column may be suspended within the jacket above the cone 5 to leave a space of variable size between the lower end of the perforated section 2 and the cone 5. Moreover, although the vertical disposition described is the most convenient, it is by no means essential that the slurry flow downwardly. For example, the flow pattern may be reversed by providing an auger or other suitable conveying means for advancing the slurry. Inclusion of a slurry conveyor would of course make it possible to operate the apparatus in any convenient position, such as horizontally. In some instances, the scraper would not be required.

The extractor may advantageously be incorporated in an apparatus system for the production of tea extracts, which would normally include facilities for stripping aromatics from the slurry and/or the extraction liquid leaving the jacket, means for separating insolubles, means for concentration, by evaporation of freeze-concentration and a dryer (spray, vacuum, drum or freeze dryer) as will be apparent from the description to be given below in respect of FIGS. 2 – 3.

The invention is illustrated by the following examples, in which the parts and percentages are given on a weight basis.

EXAMPLE 1

An extractor as shown in FIG. 1 consists of an inner perforated column 20 cm in diameter and an outer shell 30 cm in diameter, and has an effective height of 160 cm. The perforated portion of the column has an open area of 5% with holes 1.6mm in diameter.

Water at 98° C is filled into the central column at a rate of 38 parts/minute and into the annular jacket at 12 parts/minute. When the apparatus has reached operating temperature, 2 parts/minute of dry tea are mixed in the conduit 9 with water at 98° C supplied through the line 10. Metering pumps in lines 13 and 14 are set to remove 34 and 18 parts/minute of tea slurry and liquid, respectively, with a slurry hold-up time of 4 minutes. Throughout the operation, the scrapers 6 are rotated at 3 – 4 rpm.

The slurry is stripped and centrifuged and the resulting extract concentrated to 55% solids. The liquid withdrawn from the jacket is concentrated to a similar solids content, and the two extracts are combined followed by recombination of previously removed aromatics, the resultant concentrate then being freeze-dried. Tea prepared from the freeze-dried product was determined by known taste test procedure to have substantially the same aroma and flavor characteristics of freshly brewed tea.

EXAMPLE 2

An extractor was used like that in Example 1 except the perforated column had a diameter of 10 cm, the outer shell a diameter of 15 cm and the unit an effective height of 91 cm.

Water at 96.7° C is filled into the central column at a rate of 7.5 parts/minute and into the annular jacket at 4 parts/minute. When operating temperature was reached, 0.5 parts/minute dry tea was mixed in conduit 9 with 96.7° C water and fed to column 1. Tea slurry and extraction liquid were removed at 8 and 4 parts/minute respectively. Hold-up time was 3 minutes. The scrapers were operated as in Example 1.

The slurry and extraction liquid were processed as in Example 1 and tea prepared from the dried extract. In a tea test, the flavor of the product was judged to be very much like that of freshly brewed tea.

EXAMPLE 3

The extractor of Example 1 was filled with 86 parts of water at 98° C and 9.75 parts dry tea for a batch extraction operation, the jacket being filled with 109 parts of water at 98° C. After 4 minutes the extractor unit was emptied, the slurry and extraction liquid were combined and a sample of liquid extract drawn therefrom. The sample was diluted to normal drinkable strength with hot water. The tea had a taste very much like that of freshly brewed tea.

EXAMPLE 4

An extraction was carried out as in Examples 1 and 2 except the volume of slurry to volume of extraction liquid was in the ratio of 0.5 to 1. Water temperature was 98.8° C and 0.5 parts/minute dry tea and 15 parts/minute water supplied to the perforated column. 30 parts/minute water was supplied to the annular jacket. 30.5 parts/minute and 15 parts/minute were removed from the jacket and perforated column respectively. Scraper speed was 8 rpm. The slurry and extraction liquid were combined and a sample removed for test. Test results indicated that the extract was aromatic and comparable to freshly brewed tea.

Figure 2:
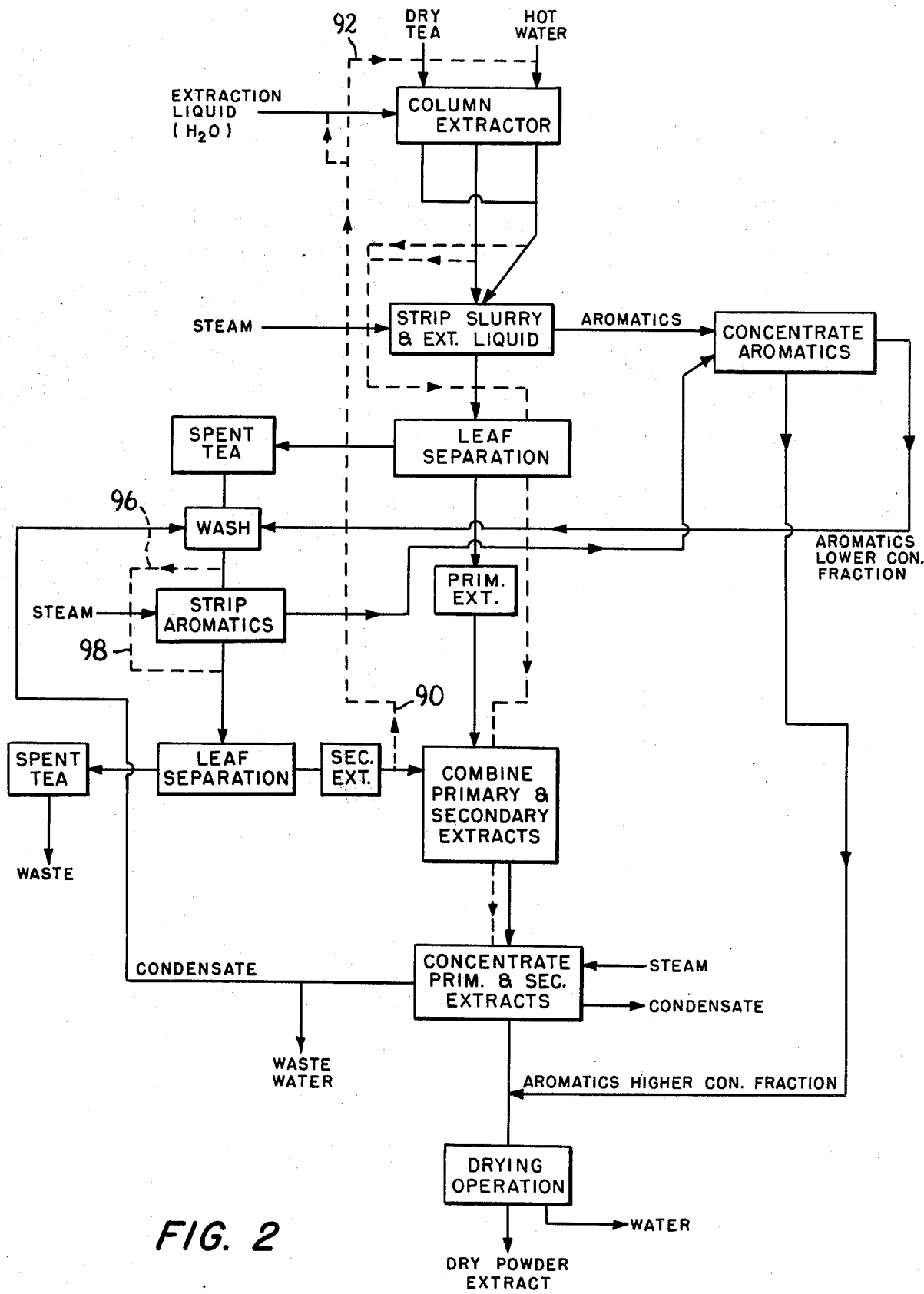
FIGS. 2 – 3 are flow diagrams illustrating various processing techniques possible with the present invention.
Figure 3:
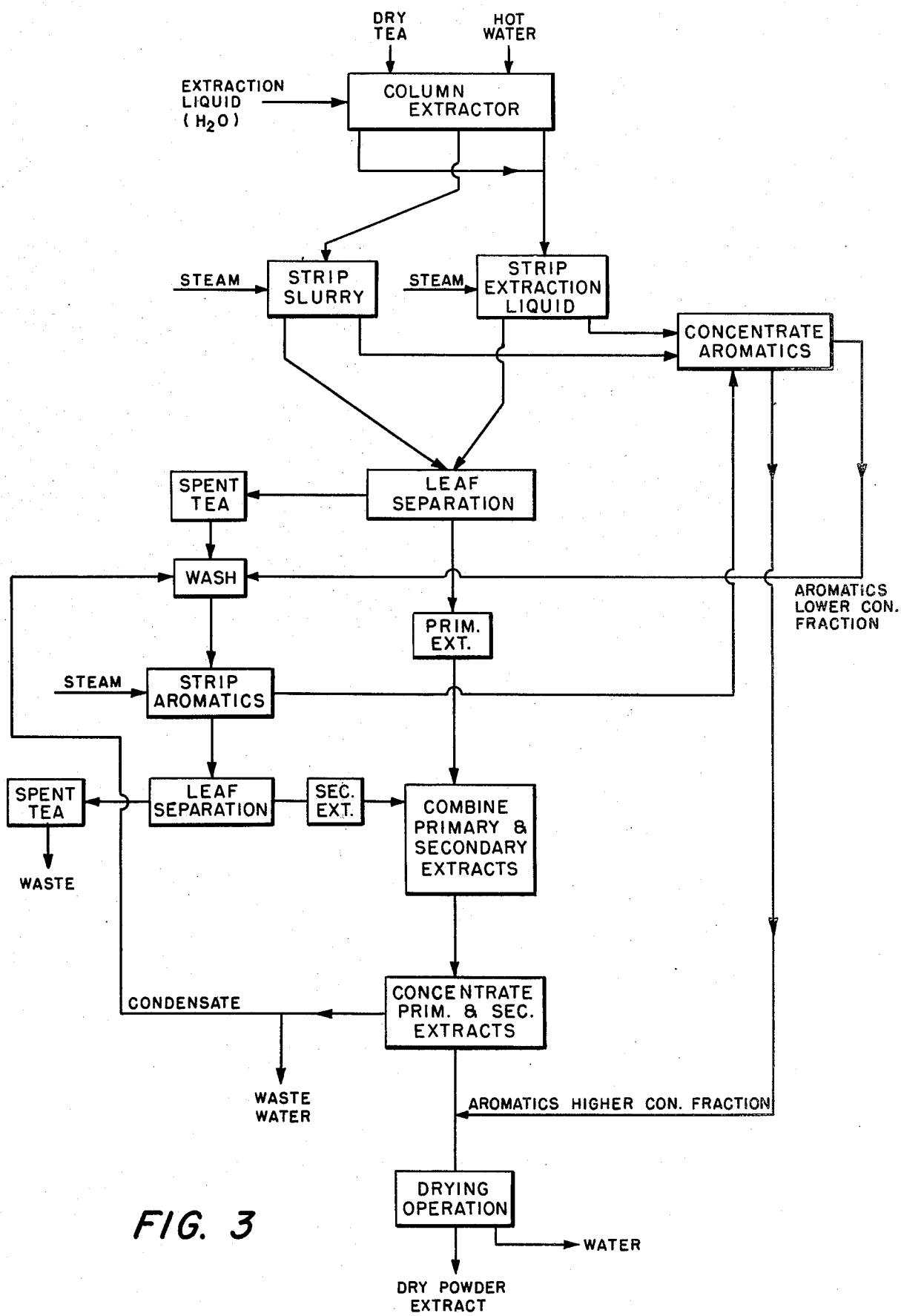

FIGS. 2 and 3 depict variations in process which can be employed in accordance with the principles of the present invention. Referring to FIG. 2, dry tea and hot water are continuously fed to the center column of the extractor to provide an aqueous tea slurry while concurrently aqueous extraction liquid is fed to the annular jacket. During steady-state operating conditions the slurry hold-up time is about 4 minutes. The extracted tea solubles containing slurry and diffused solubles containing extraction liquid are continuously removed and conveyed to an aromatic volatiles removal operation, e.g., stream stripping. The tea insolubles (leaf) are then removed leaving a resultant or primary stage extract. The leaf separated is then subjected to a wash operation to provide a secondary solubles containing extract. The primary stage aromatics removed are conveyed to an aromatic concentration operation wherein such aromatics are concentrated to produce a higher level aromatics fraction and a lower level aromatics fraction, the lower level fraction being conveyed to the wash operation along with condensate from the extract concentration operation, with the higher level aromatics fraction being recombined with the extract following concentration but prior to drying. The tea insolubles with which the secondary extract is produced are separated from the latter and the secondary extract is combined with the resultant or primary extract. As used herein "resultant extract" is in respect of subsequent processing intended to include the secondary extract. Thus when speaking of recombining the higher level aromatics fraction with the resultant extract would be inclusive of recombining them with the secondary extract also since preferably aromatics are combined following concentration, the primary and secondary extracts having already been combined for the concentration operation.

Following the wash operation, a secondary stage of aromatics is stripped and conveyed to the aromatics concentration operation. Stripping following the wash can optionally be effected either prior or subsequent to the leaf separation.

Optionally and following the wash operation at least a part of the secondary extract can as shown at 90 and 92 be separated from the tea insolubles and returned to the column extractor for use in preparing the tea slurry. It also could be used as at least part of the extraction liquid.

If freeze concentration were used to concentrate the primary and secondary extracts prior to drying, the aromatic volatile stripping operation could be eliminated and said extracts fed directly to the concentration operation as shown at 96 and 98.

The process depicted in FIG. 3 is similar to that of FIG. 2 except following extraction in the column extractor, the slurry and extraction liquid are stripped of aromatic volatiles in separate operations.

From the foregoing it will be seen that the process and apparatus of the present invention provide attainment of a tea solubles extract having flavor and aroma characteristics quite like those of freshly brewed tea.

It will be appreciated that the apparatus shown in FIG. 1 is of a character as to lend to its use in other processing as for example, fermentation of cheese and wine and others.

What is claimed is:

1. Apparatus for preparing tea extract which comprises means for enclosing a first space, means for feeding an aqueous tea slurry to said first space, means for enclosing a second space adjacent said first space, said first space having a volume of about 0.5 to 2.5 times that of said second space, means for feeding an extraction liquid to said second space, said first space enclosing means including wall structure separating said first and second spaces, said wall structure being provided with openings communicating said first space with said second space, said openings being of a size sufficient to permit tea soluble solids to pass through said wall structure from the aqueous tea slurry in said first space into extraction liquid in said second space but insufficient to permit tea insolubles to pass from said first space to said second space, and means for removing aqueous tea slurry and extraction liquid from said first and second spaces respectively.

2. Apparatus for preparing tea extract in accordance with claim 1 in which said openings comprising about 5% of the area of said wall structure.

3. Apparatus for preparing tea extract in accordance with claim 1 in which said openings are substantially 1.6mm diameter circular openings.

4. Apparatus in accordance with claim 1 in which the means for removing aqueous tea slurry and extraction liquid from said first and second spaces, respectively, comprises pump means operable to remove aqueous tea slurry and extraction liquid at lesser and greater rates respectively than they are fed into said spaces.

5. Apparatus in accordance with claim 1 in which said means for feeding an aqueous slurry to said first space comprises a feeder unit for feeding dry tea and an aqueous medium at controlled rates.

6. Apparatus for preparing tea extract which comprises means for enclosing a first space, means for feeding an aqueous tea slurry to said first space, means for enclosing a second space adjacent said first space, said first space having a volume of about 0.5 to 2.5 times that of said second space, means for feeding an extraction liquid to said second space, said first space enclosing means including wall structure separating said first and second spaces, said wall structure being provided with openings communicating said first space with said second space, said openings being of a size sufficient to permit tea soluble solids to pass through said wall structure from the aqueous tea slurry in said first space into extraction liquid in said second space but insufficient to permit tea insolubles to pass from said first space to said second space, and means for removing aqueous tea slurry and extraction liquid from said first and second spaces respectively, said first space enclosing means being an elongated hollow cylinder, said second space enclosing means comprising another elongated hollow cylinder enclosing said first-mentioned cylinder and disposed coaxial therewith.

7. Apparatus for preparing tea extract in accordance with claim 6 in which the ratio of the diameter of said other cylinder to that of said first-mentioned cylinder is about 1.5 to 1.

8. Apparatus in accordance with claim 6 in which said cylinders are substantially coextensive in length, the first-mentioned cylinder being provided with openings in the encircling wall structure thereof, the means for feeding aqueous tea slurry and extraction liquid to said two spaces being connected at one end of said cylinders, the means for removing aqueous tea slurry and extraction liquid being connected at the other end of said cylinders, the openings in said first-mentioned cylinder being designed in arrangement thereof along the length of said first-mentioned cylinder from said other end thereof in the direction of the first-mentioned end a distance of about 80% to 85% the length of said cylinder.

9. Apparatus in accordance with claim 6 in which means are provided for engageably scraping the opening containing surface of said first-mentioned cylinder to prevent plugging of tea insolubles across said openings.

10. Apparatus in accordance with claim 9 in which said scraping means comprises a rotatable shaft extending axially centrally through said first-mentioned cylinder, arms carried by said shaft and extending radially therefrom, and scraper blades carried at the tip ends of said arms and engaging the inner surface of said first-mentioned cylinder.

* * * * *